United States Patent
Ninoles et al.

(10) Patent No.: US 10,075,495 B2
(45) Date of Patent: Sep. 11, 2018

(54) SYSTEMS AND METHODS FOR VIDEO GAME STREAMING UTILIZING FEEDBACK AND AGGREGATION OF VIEWER INTERESTS AND INTERACTIONS

(71) Applicant: GENVID TECHNOLOGIES, INC., New York, NY (US)

(72) Inventors: Fabien Ninoles, Montréal (CA); Jocelyn Houle, Mont-St-Hilaire (CA)

(73) Assignee: Genvid Technologies, Inc., New York, NY (US)

( * ) Notice: Subject to any disclaimer, the term of this patent is extended or adjusted under 35 U.S.C. 154(b) by 162 days.

(21) Appl. No.: 15/352,441

(22) Filed: Nov. 15, 2016

(65) Prior Publication Data
US 2018/0139257 A1    May 17, 2018

(51) Int. Cl.
H04L 29/06         (2006.01)

(52) U.S. Cl.
CPC ...... *H04L 65/4076* (2013.01); *H04L 65/4092* (2013.01)

(58) Field of Classification Search
CPC .................. H04L 65/4092; H04L 65/4076
See application file for complete search history.

(56) References Cited

U.S. PATENT DOCUMENTS

| | | | |
|---|---|---|---|
| 6,072,503 A | 6/2000 | Tani et al. | |
| 6,791,579 B2 | 9/2004 | Markel | |
| 7,446,722 B2 | 11/2008 | Sohfuku | |
| 9,266,017 B1 | 2/2016 | Parker et al. | |
| 2005/0210512 A1 | 9/2005 | Anderson et al. | |
| 2014/0366057 A1 | 12/2014 | Brockmann et al. | |
| 2016/0030841 A1 | 2/2016 | Perlman et al. | |
| 2017/0303001 A1* | 10/2017 | Montoya | H04N 21/4667 |
| 2018/0097862 A1* | 4/2018 | Price | H04L 69/16 |

OTHER PUBLICATIONS

U.S. Appl. No. 15/352,421, filed Nov. 15, 2016, Ninoles et al.
U.S. Appl. No. 15/352,433, filed Nov. 15, 2016, Houle et al.

* cited by examiner

*Primary Examiner* — Kim T Nguyen
(74) *Attorney, Agent, or Firm* — Foley & Lardner LLP

(57) ABSTRACT

Systems and methods to provide adaptable live video game streaming can include one or more servers selecting a video game stream from a plurality of video game streams associated with distinct viewpoints of an online game, and transmitting a first plurality of video game frames of the selected video game stream to a live streaming system for streaming to a plurality of client devices. The server(s) can receive feedback data from the plurality of client devices, and analyze the feedback data to determine an aggregate user interest in a portion of video game content associated with the online game. The server(s) can transmit a second plurality of video game frames associated with the portion of video game content to the live streaming system for streaming to the client devices.

20 Claims, 5 Drawing Sheets

SYSTEMS AND METHODS FOR VIDEO GAME STREAMING UTILIZING FEEDBACK AND AGGREGATION OF VIEWER INTERESTS AND INTERACTIONS

BACKGROUND

Live game (and eSports) streaming platforms, such as Twitch, YouTube Gaming, Ustream, and other platforms (or websites) allow game players to livestream their video game plays. Players in multi-player online have shared their game plays online via the live streaming platforms. Viewers (or spectators) watch the games in real-time as they progress. Some live game streaming platforms support separate live chat features allowing viewers or spectators to comment on games they are watching and share their comments with other viewers.

Due to the technological challenges, the live game feeds have limited functionality diminishing gaming and spectator entertainment. Every month, live game steaming platforms nevertheless attract millions of gamers, including players and spectators. There is need for technological improvement to provide more advanced live gaming.

SUMMARY

At least some embodiments relate to a system to provide adaptable video game streaming that can include one or more computer servers comprising a video streaming engine and an analysis engine. The video streaming engine can select a video game stream from a plurality of video game streams associated with distinct viewpoints of an online game, and transmit a first plurality of video game frames of the selected video game stream to a live streaming system. The live streaming system can stream the first plurality of video game frames to a plurality of client devices associated with a respective plurality of spectators of the online game. The analysis engine can receive feedback data from the plurality of client devices. The feedback data can be related to user interactions with one or more interactive overlays or to user comments made responsive to display of the first plurality of video game frames on the plurality of client devices. The analysis engine can analyze the received feedback data to determine an aggregate user interest in a portion of video game content associated with the plurality of video game streams, and cause the video streaming engine to transmit a second plurality of video game frames associated with the portion of video game content to the live streaming system for streaming to the plurality of client devices.

At least some embodiments relate to a method of providing adaptable live video game streaming. The method can include one or more processors selecting a video game stream from a plurality of video game streams associated with distinct viewpoints of an online game, and transmitting a first plurality of video game frames of the selected video game stream to a live streaming system. The live streaming system can stream the first plurality of video game frames to a plurality of client devices associated with a respective plurality of spectators of the online game. The one or more processors can receive feedback data from the plurality of client devices. The feedback data can be related to user interactions with one or more interactive overlays or to user comments made responsive to display of the first plurality of video game frames on the plurality of client devices. The one or more processors can analyze the received feedback data to determine an aggregate user interest in a portion of video game content associated with the plurality of video game streams, and transmit a second plurality of video game frames associated with the portion of video game content to the live streaming system for streaming to the plurality of client devices.

At least some embodiments relate to a non-transitory computer-readable medium including computer code instructions thereon. The computer code instructions, when executed by one or more processors, can cause the one or more processors to perform a method of providing adaptable live video game streaming. The method can include selecting a video game stream from a plurality of video game streams associated with distinct viewpoints of an online game, and transmitting a first plurality of video game frames of the selected video game stream to a live streaming system. The live streaming system can stream the first plurality of video game frames to a plurality of client devices associated with a respective plurality of spectators of the online game. The method can include receiving feedback data from the plurality of client devices. The feedback data can be related to user interactions with one or more interactive overlays or to user comments made responsive to display of the first plurality of video game frames on the plurality of client devices. The method can include analyzing the received feedback data to determine an aggregate user interest in a portion of video game content associated with the plurality of video game streams, and transmitting a second plurality of video game frames associated with the portion of video game content to the live streaming system for streaming to the plurality of client devices.

BRIEF DESCRIPTION OF THE DRAWINGS

The details of some embodiments are set forth in the accompanying drawings and the description below. Other features, aspects, and advantages of the various embodiments will become apparent from the description, the drawings, and the claims, in which:

Figure 1:
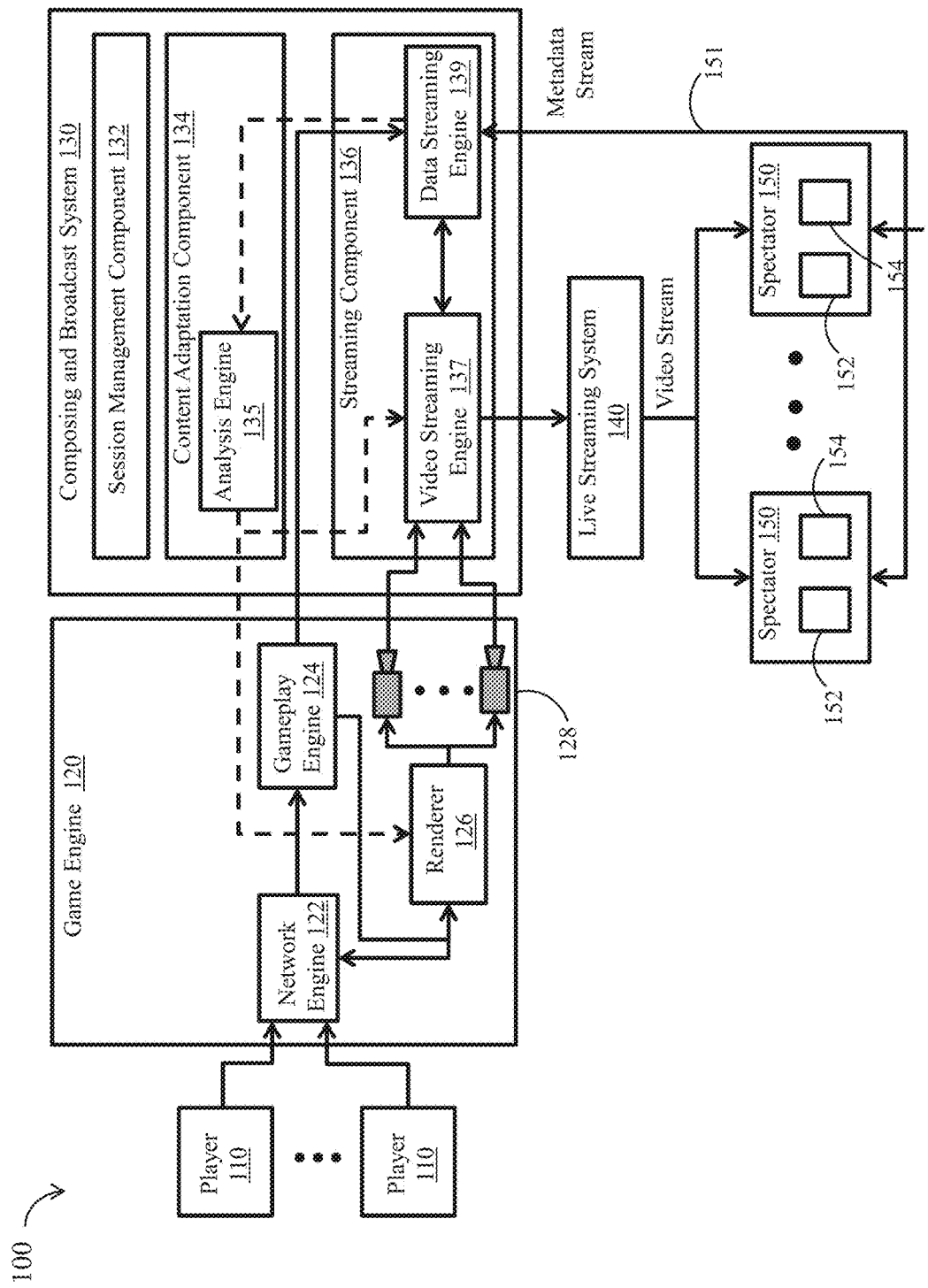
FIG. 1 is a block diagram illustrating a computer environment for providing adaptable live video game streaming based on spectator user feedback, according to some embodiments.

Some or all of the figures are schematic representations for purposes of illustration. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

DETAILED DESCRIPTION

Following below are more detailed descriptions of various concepts related to, and implementations of, methods, apparatuses, and systems for game streaming adaptation solutions. Game streaming adaptation solutions relate to techniques and tools for adapting video game streams and viewer experience based on aggregated user interests and user interactions with streamed video game content. The various concepts introduced above and discussed in greater detail below may be implemented in any of numerous ways as the described concepts are not limited to any particular manner of implementation. Examples of specific implementations and applications are provided primarily for illustrative purposes.

Live game streaming platforms add another dimension to online gaming that can lead to a dramatic increase in online gaming communities. This potential interest in live game streams calls for improvements to user experience beyond video streaming quality. For example, providing video game streaming adaptation based on aggregated user feedback and user interactions with the streamed video content can enhance viewer experience.

Existing live game streaming solutions provide the same content to various users. Some live game streaming platforms offer separate chat solutions with the streamed video, allowing spectators to comment on the game and interact with other spectators. However, the spectators' viewing experience is still passive as viewers do not have much influence on the game content displayed to them. Systems, apparatuses, and methods described herein allow for monitoring viewers interests in, and interactions with, content provided in live video game streaming, and adjusting the streamed content, in real time, based on viewer interests or interactions. For example, the systems, apparatuses, and methods described herein can collect feedback data indicative of viewer response to displayed video game content from a plurality of client devices, analyze the feedback data, and adjust or adapt the video game content streamed to the client devices based on the results of the analysis of the feedback data. The feedback data can include data generated based on chat data from a chat conversation between various viewers, data indicative of viewer interactions with one or more interactive overlays displayed over video frames displayed on the client devices, or a combination thereof. Adjusting the video game content can include switching from one video game stream to another video game stream associated with distinct viewpoint than the first one, combining two or more video game streams, re-streaming a video segment (or a subset of video game frames previously streamed) for replay at the client devices, applying some video editing to a video game stream, or a combination thereof.

Adjusting live video game streaming content based on viewer feedback where thousands of viewers may be involved poses significant technical challenges. The large number of spectators and the amount of feedback data that may be produced by each client device may imply receiving and managing a substantially large amount of feedback data from the client devices. Analyzing such amount of data is technologically challenging and can be computationally costly, and can involve substantially long processing time. Such processing time may be too long to allow for real time adaptation of streamed video game content. Applying separate content adaptations to video game content streamed to separate client devices leads to increased system complexity.

Novel concepts and technological advancements described herein allow for efficient and real time adaptation or adjustment of streamed video game content in live video game streaming. Systems, apparatuses, and methods described herein can support real time adaptation or adjustment of live game streaming for hundreds of thousands or millions of spectators while maintaining healthy states.

Systems, apparatuses, and methods to provide real time adaptation of video game streaming based on aggregated viewer feedback data can include a composing and broadcast system receiving, from a game engine, a plurality of video game streams associated with a respective plurality of viewpoints of an online game. In some embodiments, the composing and broadcast system can select a video game stream of the plurality of video game streams, and transmit a first plurality of video game frames of the selected video game stream to a live streaming system. The live streaming system can stream the first plurality of video game frames to a plurality of spectator client devices. In some embodiments, the composing and broadcast system can transmit a plurality of game data frames to the plurality of spectator client devices. Each game data frame can include positioning data for positioning one or more interactive overlays over a video game frame corresponding to that game data frame. For instance, each game data frame include information indicative of the location(s) of one or more graphical objects in the corresponding video game frame.

In some embodiments, at each spectator client device of the plurality of client devices, an application (e.g., a browser or a gaming application) can play the video sequence received from the live game streaming system. Simultaneously, one or more software scripts (e.g., including a Java script) can cause that client device to display the one or more interactive overlays over each displayed video game frame of the video game frames based on the location(s) of the one or more graphical objects in that displayed video game frame. The one or more software scripts can cause the spectator client device to collect or record user interactions with the one or more interactive overlays. The one or more software scripts can monitor and process chat messages between that client device and other client devices. The one or more scripts can cause the client device to transmit feedback data indicative of user interactions and/or user comments in relation with the displayed video game frames.

The composing and broadcast system can receive feedback data from the plurality of spectator client devices, analyze the feedback data, and determine an aggregate user interest in one or more aspects of the online game (e.g., interest in a specific player avatar, a specific region of the virtual environment of the online game, or specific event of the online game). The composing and broadcast system can determine a set of video game frames associated with the one or more aspects of the video game, and transmit the set of video game frames to the live streaming system for streaming to the plurality of spectator client devices.

FIG. 1 is a block diagram illustrating a computer environment 100 for adapting or modifying streamed video game content in live video games streaming based on cumulative or aggregate spectator feedback or interactions, according to some embodiments. The computer environment 100 can include a plurality of player client devices 110, a game engine 120, a composing and broadcast system 130, a live streaming system 140, and a plurality of spectator client devices 150. The game engine 120 can include a network engine 122, a gameplay engine 124 and a render 126. The composing and broadcast system 130 can include a session management component 132, a content adaptation component 134, and a streaming component 136. The content adaptation component 134 can include one or more analysis engines 135. The streaming component 136 can include one or more video streaming engines 137 and one or more data streaming engines 139.

The player client devices 110 can include an application, such as a browser or a gaming application to initiate and participate in an online game as a player. When participating in the online game, a player client application 110 can control one or more avatars in the game. In a multi-player game, separate player client devices 110 can control separate or distinct avatars. The application can allow initiating a live game streaming session to broadcast a game play online. The online game can be provided by the game engine 120.

The game engine 120 can include a software, running on one or more computing devices, for creating and developing a video game. The game engine 120 can include a network engine 122 for communicating with player client devices 110. The network engine 122 can establish communication channels between the game engine 120 and the player client devices 110, upon the player client devices 110 initiating a game session. The network engine 122 can transmit video game streams (e.g., each including a respective video stream and a respective audio stream) of the game from the renderer 126 to the player client devices 110. Each player client device 110 can receive a respective video game stream over a communication channel between that player client device 110 and the game engine 120. For each player client device 110, the respective received video game stream can correspond to a viewpoint associated with an avatar controlled by that player client device 110. As a user of a player client device 110 interacts with the game, that player client device 110 can transmit signals indicative, or indications, of actions taken by the user to the network engine 122. The network engine 122 can forward the received signals or indications the gameplay engine 124.

The gameplay engine 124 can analyze the received signals or indications received from the player client device 110 to detect game events corresponding to the user actions. For example, the gameplay engine 124 can detect game events, such as motion, changes in player's viewpoint, collisions, kills, clicks on menu elements, or the like. The gameplay engine 124 can forward indications of the detected events to the renderer 126. The gameplay engine 124 can also maintain game data, such as scores, equipment, or other information associated with various players or graphical objects in the game. The gameplay engine 124 can transmit the game data (also referred to herein as metadata) or indications of some of the detected events to the composing and broadcast system 130.

The renderer 126 can generate a video game stream (e.g., including video and audio frames) for each player (or each player client device 110), based on the viewpoint and the detected events associated with that player client device 110. The renderer 126 can forward generated video and/or audio frames to the network engine 122 for steaming to the player client devices 110. The renderer 126 may also generate other video game streams corresponding to additional viewpoints associated with virtual cameras (e.g., not associated with players or player avatars). The renderer 126 can transmit generated video game frames from the various video game streams 128, e.g., associated with players and virtual cameras, to the composing and broadcast system 130.

The composing and broadcast system 130 can include one or more computer servers (e.g., Linux servers) for executing a cluster of virtual servers (both not shown in FIG. 1) for each video/audio stream, e.g., associated with a respective game and a group of players or player client devices 110. The composing and broadcast system 130 can execute a plurality of clusters of virtual servers, associated with a respective plurality of video/audio streams (or game broadcast sessions), simultaneously. The cluster of virtual servers can handle three types of data; commands received either from the game engine 120 to create (or terminate) a game broadcast session or from spectator client devices 150 to access the game broadcast session, game and events data received either from the game engine 120 or collected from the spectator client devices 110. The cluster of virtual servers can include three different types of virtual servers for running or executing different types of services (or processes). The three types of virtual servers can include supervisor servers, internal worker servers, and public worker servers. Services provided or executed by the cluster can include streaming services, control services, communication services, authentication services, event services, or a combination thereof.

The supervisor servers can supervise and coordinate the services (or processes) running on the worker servers (e.g., internal ad public worker servers). The supervisor servers can be a small group of micro servers that act as a point of registration and authority, or orchestration, for all the other services. While a single supervisor server may be enough, it may be desirable to have three or more supervisor servers are to achieve high availability of the cluster. The group of supervisor servers can keep the state of orchestration services consistent using, for example, a gossip protocol with a simple majority. The consistency between various supervisor servers with respect to the state of orchestration allows for half of the supervisor servers to go down without affecting the services provided or executed by the cluster. The supervisor servers can run or execute tasks such as, High-Available Key-Value store for configuration, registration service(s), monitoring service(s), scheduler service(s), or a combination thereof. The registration services relate to the mechanisms or tools provided to allow the game engine 120 or the player client applications 110 to register or initiate a game broadcast session. Registration service(s) can be exposed to the game engine 120 (or player client devices 110) through a domain name system (DNS) and/or a hypertext transfer protocol (HTTP) application program interface (API). The supervisor servers can monitor other services (or processes) executed by internal and public worker servers and report the health of the different worker server instances. The scheduler service(s) can include scaling up and down the different services (e.g., executed by the worker servers) and restart them when they go down. The supervisor servers may be designed not to run or execute other tasks (e.g., beyond the tasks described above), instead the supervisor servers can delegate such other tasks to the worker servers.

The internal and public worker servers can be configured to execute and monitor the tasks scheduled by the supervisor servers. The difference between the public and internal workers is that only the public workers can be accessible from an external, unregistered Internet protocol (IP) address. The internal workers can be accessible to a limited set of pre-registered network range (e.g., IP addresses associated with the game engine 120), as a security precaution. The public worker servers can be configured to execute processes and tasks related mainly to the spectator client devices 150, whereas the internal worker servers can execute processes and tasks associated with the gaming engine 120. Given that the number of spectator client devices 150 can be relatively large (e.g., compared to the number of player client devices 110), the cluster can include a larger number of running instances of public worker servers than the internal worker servers. Both public and internal worker servers can run a client version of the orchestration services to report to the supervisor servers. The supervisor servers can be configured to automatically provision, allocate, or de-allocate worker servers as the load of processes (or services) goes up and down. Since, the internal worker servers handle mainly services related to the game engine 120, the internal worker servers can have a more stable load than public worker servers. The load of public worker servers can be proportional to the number of spectator client devices 150. As spectators connect or drop off, the load of public worker servers can vary dynamically over time.

The use of virtual servers, as described above, to implement the composing and broadcast system 130 can allow for dynamic system scalability whether in terms of the number of clusters running or the number of virtual servers in each cluster. The composing and broadcast system 130 may allocate a respective cluster of virtual servers for each initiated game broadcast session, and de-allocate that cluster once the game broadcast session is terminated. Also, as described above, the supervisor servers in each cluster can dynamically allocate or de-allocate worker servers as the load of running services (or the number of spectator client devices 150) increases or decreases. In some embodiments, the composing and broadcast system 130 can be implemented as a software development kit (SDK) that is integrated with the game engine 120.

While the implementation of composing and broadcast system described herein is based on virtual servers, such implementations should not be interpreted as limiting, and other implementations are contemplated by embodiments of this disclosure. For example, the composing and broadcast system 130 can run (or execute) on one or more player client devices 110. The player client device(s) 110 can still transmit the video game stream(s) to the live streaming system 140, and transmit game data (or metadata) to one or more engines associated with the live streaming system 140 for multicasting to the spectator client devices 150.

The composing and broadcast system 130 can include a session management component 132. The session management component 132 can be configured to provide and manage various services (or processes) including control service(s), user authentication service(s), and communication service(s). Control Service(s) can provide the point of entry for the game engine 120 to other services of the composing and broadcast system 130. The control service(s) can allow the game engine 120 to register a new stream (or new game broadcast session) and request for new channel endpoint. The control service(s) can also provide information about the health of the cluster via an administrative interface associated with, for example, the game engine 120. An administrator of the game engine 120 can monitor and administrate the cluster via the administrative interface. The control service(s) can also provide information related to registered streams (e.g., registered for live streaming) to be published for spectator client devices 150 or other client devices.

Authentication service(s) (or process(es)) can allow client devices to query the composing and broadcast system 130 about current streams playing (if any) and to request a new entry point for the streaming service(s) provided by the streaming component 136. The communication service(s) (or process(es)) can include handling with the spectator client devices 150. In particular, the communication service(s) can include establishing and/or terminating communication channels 151 with spectator client devices 150 as such devices connect to or disconnect from the composing and broadcast system 130. The established communication channels 151 can be bi-directional channels for carrying game data received, for example, from the gameplay engine 124 to spectator client devices 150, or carrying user feedback data from the spectator client devices 150 to the composing and broadcast system 130.

The content adaptation component 134 can be configured to process user feedback data received from the spectator client devices 150. The interaction component 134 can include one or more analysis engines 135 for analyzing user feedback data received from the spectator client devices 150. The analysis engine(s) 135 can analyze user feedback data received from various spectator client devices 150, via communication channels 151, to determine aggregate user interest(s) in one or more aspects of the online game. For example, the analysis engine 135 can detect an interest by a plurality of viewers (or spectators) in a given player (or player avatar), based on received feedback data. The analysis engine 135 can detect an interest by a plurality of viewers in a given player region (or graphical object) of the virtual environment of the online game, based on received feedback data. The analysis engine 135 can detect an interest by a plurality of viewers in a given event of the online game associated with set of previously streamed video game frames, based on received feedback data. The analysis engine 135 can provide indication(s) of detected aggregate user interest to the video streaming engine 137 (or some other engine of the streaming component 136), and to the renderer 126 (or some other engine within the game engine 120). For instance, the analysis engine 135 can cause the video streaming engine 137 to start streaming from a different video game stream or a different video game segment than the video game stream or the video game segment it is currently streaming from. Also, the analysis engine 135 can cause the renderer 126 to change one or more viewpoints, for example, by zooming in, zooming out, or changing the location and/or orientation of a viewpoint.

The streaming component 136 can include a plurality of streaming engines including one or more video streaming engines 137 and one or more data streaming engines 139. In some embodiments, the video streaming engine(s) 137 and the data streaming engine(s) can include (or can be implemented using) public worker servers. The video streaming engine(s) 137 can receive a plurality of video game streams 128 from the renderer 126, each corresponding to a respective viewpoint. Each received video game stream can include video and audio data. The video streaming engine(s) 137 can select one of the video game streams, encode respective video and audio frames into compressed video/audio frames, and transmit the compressed video/audio frames to the live streaming system 140. The video streaming engine(s) 137 can encode the video data of the selected video game stream, for example, using H.264/MPEG-4 AVC or some other video compression standard. The video streaming engine(s) 137 may also encode the audio data of the selected video game stream, for example, using MPEG-2 Audio Layer III (MP3), Advanced Audio Coding (AAC), or another audio coding format.

The data streaming engine 139 can be configured to receive game data received from the gameplay engine 124. In some embodiments, the data streaming engine 139 can generate data frames, based on game data received from the gameplay engine 124, according to a predefined format. The data streaming engine 139 may also filter the game data received from the gameplay engine 124 when generating the data frames. Each data frame can include a respective timestamp (or time code) to synchronize the data frame with a respective video game (or video/audio) frame. The timestamp associated with each data frame can allow placing that data frame within a game data stream and mapping that data frame to the corresponding video game frame. The data streaming engine 139 can communicate with the video streaming engine 137 to coordinate allocation of timestamps to video game frames and data frames. As discussed in further detail below, a data frame can include information indicative of positions(s) of one or more graphical objects within the corresponding video frame, viewpoint information, game event information, list of players or player avatars, or a combination thereof. The data streaming engine(s) 139 can stream the data frames carrying game data (or metadata) to the plurality of spectator client devices 150 through respective communication channels 151. The data streaming engine(s) 139 can stream the data frames according to the respective time frames.

The live streaming system 140 can include a live game streaming platform such as Twitch, Ustream, YouTube Gaming, or the like. The live streaming system 140 can receive the video game frames from the video streaming engine 137, and broadcast the video game frames, e.g., via a respective web page, to the spectator client devices 150. The live streaming system 140 can modify the timestamps of the video game frames before broadcasting to the spectator client devices 150.

Each spectator client device 150 can include an application 152 for playing the video game stream received from the live streaming system 140, and one or more software scripts 154 for generating and displaying an overlay based at least on the data stream received from the data streaming engine 139. The software script(s) can include, for example, a Java script and/or one or more other software modules. The software script 154 can cause the spectator client device 150 to scan each data frame received to retrieve the respective timestamp and position information for one or more graphical objects (e.g., one or more player avatars). The software script(s) 154 can compare the retrieved timestamp to one or more timestamps associated with the video game frames to map the scanned data frame to the corresponding video game frame. Since the data stream and the video game stream are received from distinct sources through distinct communications paths, the spectator client device 150 may apply techniques described synchronization techniques described in the U.S. patent application Ser. No. 15/352,433, entitled "SYSTEMS AND METHODS FOR UTILIZING CLIENT-SIDE SYNCHRONIZATION OF VIDEO AND OVERLAY,", which is incorporated herein by reference in its entirety.

Upon determining a video frame corresponding to the scanned data frame, the software script(s) 154 can cause the spectator client device 150 to display an interactive overlay over the determined video frame, based on the position of a graphical object in the determined video game frame. In some embodiments, the software script(s) 154 can cause the spectator client device 150 to display a plurality of interactive overlays, for example, each associated with a respective player avatar. The user of the spectator client device 150 can interact with the interactive overlay, for example, by clicking, touching, or hovering over the graphical object (or a screen area associated therewith) whose position is used to place the interactive overlay over the determined video frame.

The interactive overlay can allow the user of the spectator client device 150 to interact with the displayed video game frames in a variety of ways. Also, synchronizing the interactive overlay temporally and spatially with a graphical object (e.g., a player avatar) can allow the spectator users to customize or personalize their views of the game (e.g., local customization at the spectator client device 150) in a meaningful an fun way, as described in U.S. patent application Ser. No. 15/352,421, entitled "SYSTEMS AND METHODS OF VIDEO GAME STREAMING WITH INTERACTIVE OVERLAY AND ADDITIONAL DATA", which is incorporated herein by reference in its entirety.

The software script(s) 154 can cause the spectator client device 150 to transmit indications of user interactions with the overlay and or indications of user comments (e.g., via chat) to the composing and broadcast system 130. The software script(s) 154 can cause the spectator client device 150 to monitor and record interactions with the interactive overlay(s). The software script(s) 154 can cause the client device 150 to process chat data associated with chat messages with other client devices 150, for example, to extract predefined keywords. The software script(s) 154 may also cause the client device 150 to process audio signals received from a microphone communicatively coupled to the client device. The audio signals can be representative of audible user speech while watching the video game steam. The software script(s) 154 may include speech recognition tools to identify predefined keywords in the audio signals. The software script(s) 154 can cause the client device 150 to generate user feedback data based on the recorded user interactions and/or keywords identified in chat messages and/or audio signals. The generated feedback data represent a concise summary of user interactions and user comments. The composing and broadcast system 130 can use such indications, for example, to adapt or change the video game stream streamed to the spectator client devices 150.

Figure 2:
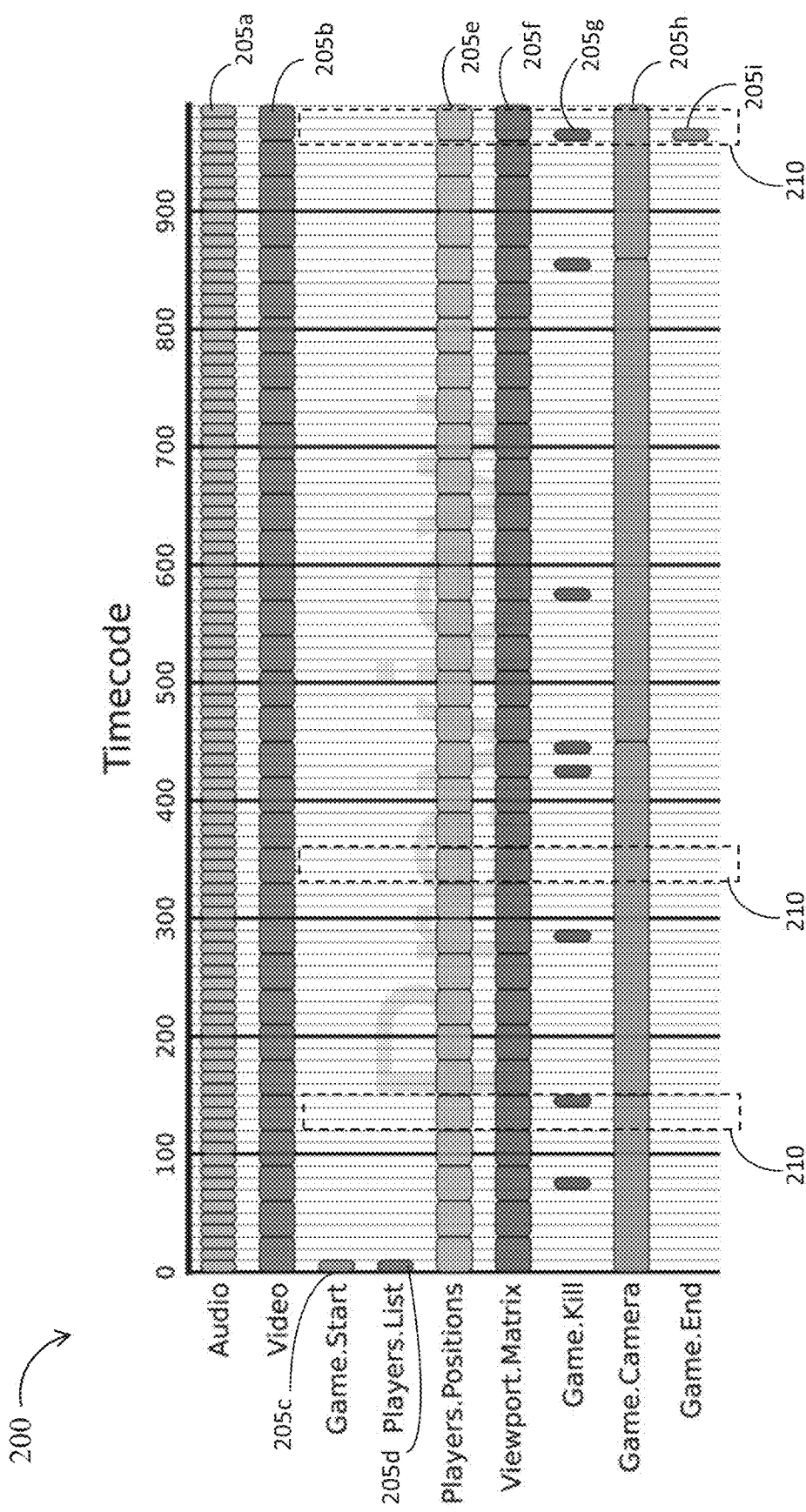
FIG. 2 is a graphical representation of several example data streams, according to some embodiments.

FIG. 2 is a graphical representation 200 of several example data streams 205a-205i (generally referred to as data streams 205), according to some embodiments. The data streams 205 are shown along a time (or timecode) axis which starts from zero on the left hand side of FIG. 2. Each data stream 205 can include one or more data chunks, each of which corresponds to a particular time instant/interval (or timecode). The video and audio streams 205a and 205b can be generated and provided by the renderer 126, whereas the streams 205c-i can be transmitted by the gameplay engine 124 to the data streaming engine 139.

Since the renderer 126 can generate and provide a plurality of video game streams (e.g., each including a video stream 205a and an audio stream 205b) associated with the plurality of viewpoints, the gameplay engine 124 can provide a single instance of each the streams 205c-i or can provide a plurality of instances of at least one of the streams 205c-i. For instance, the gameplay engine 124 can provide a plurality of streams 205f, each associated with a respective viewpoint 128. In some embodiments, the gameplay engine 124 can provide the data streaming engine 139 with a separate set of streams 205e-g or 205e-f for each viewpoint 128.

Each of the streams 205 can include a common stream identifier (ID). The stream ID can be indicative of (or can identify) the stream registered, e.g., for live streaming, by the player client devices 110 or by the game engine 120. For instance, upon request from one of the player client devices 110 to live stream the respective game play, the game engine 120 can initiate stream or game play) registration with the composing and broadcast system 130. The game engine 120 may, for example, identify a video frame rate and/or a bit rate as part of the stream (or game play) registration process. The composing and broadcast system 130 can assign a stream ID to identify all streams 205 associated with game play. The composing and broadcast system 130 can provide the assigned stream ID to the game engine 120, and the gameplay engine 124 and the renderer 126 can insert the stream ID in all streams 205. The stream ID can allow the composing and the broadcast system 130 to map the streams 205 to one another and to the game play associated with the player client device(s) 110.

Also, the gameplay engine 124 and the renderer 126 may insert a respective timestamp in each data chunk of the streams 205. For example, the gameplay engine 124 and the renderer 126 may embed the timestamps (or timecode information) in a header associated with each data chunk. The time stamps can allow streaming video and audio frames as well as data chunks/frames to spectator client devices in the right order. Also, the timestamps can allow computing devices receiving the data streams 205 (or data associated therewith) to synchronize the data chunks across various data streams 205. It should be understood that FIG. 2 is illustrative only, and that in some implementations, additional or different data streams 205 may be included without departing from the scope of this disclosure.

The data streaming engine 139 can generate one or more game data streams, for example, based on data in streams 205c-i, for streaming to the spectator client devices 150 via the respective channels 151. For example, the data streaming engine 139 can generate a single game data stream by combining concurrent data chunks from streams 205c-i (or a subset thereof) into a single data frame 210. The generated game data stream can include data frames 210 that coincide in time and duration with the video frames in the stream 205b. The size of the data frames 210 can vary over time. For example, event data from stream 205g, which indicates events occurring in the game, may not appear in each data frame 210. Also, the Game.Start data stream 205c can include a single data chunk associated with timecode 0, which can mark the beginning of the video game. Similarly, the Players.List data stream 205d can include a single data chunk associated with timecode 0. The Players.List data stream 205d can include information such as a total number of players in the video game, as well as information relating to each of the players, such as unique identification information (e.g., respective avatar name) and character information for each player. The Game.Start data and the Players.List data may appear, for example, only in the first data frame 210 of the data stream generated by the data streaming engine 139. The data streaming engine 139 can insert the stream ID and a single timestamp (e.g., timestamp from corresponding Players.Positions data chunk or corresponding Viewport.Matrix data chunk) in each data frame 210. Also, the same stream ID can be embedded (e.g., by the rendered 126 or the video streaming engine 137) in the corresponding game video stream provided to the live streaming system 140.

The data streaming engine 139 can generate the game data stream in one of various other ways. For example, the data streaming engine 139 may generate a first game data stream including only Players.Positions data from stream 205e and Viewport.Matrix data from stream 205f. The Players.Positions data stream 205e can include data indicative of the positions of the various players (or player avatars) within a virtual environment of the video game. For a given player avatar (or graphical object) in the online game, the respective Players.Positions data can be indicative of a pixel region (e.g., a rectangle) representative of the location of that player avatar (or graphical object) in a specific video frame of the stream 205b. The Viewport.Matrix data stream 205f can include information related to the viewpoint 128 associated with the video stream 205a. The data streaming engine 139 may embed Viewport.Matrix data associated with various players (player avatars) and/or various virtual cameras in the online game in each data frame 210.

Because the position of each player may change in every video frame, the Players.Positions data stream 205e can be updated at the same rate as the video data stream 205b. This information also can be expected to change at the same rate as the video data stream 205b and the Players.Positions data stream 205e. Like the Players.Positions data stream 205e, the Viewport.Matrix data stream 205f also can be updated at the same rate as the video data stream 205b.

The Game.Kill data stream 205g can include information relating to the elimination (or killing) of players (or player avatars) from the video game. This data is asynchronous and non-continuous, because it is only updated as players are eliminated from the video game. In some implementations, each data chunk of the Game.Kill data stream 205h can include an identification of the player who has been eliminated. In some implementations, the information included in the Game.Kill data stream 205g can be used along with the information in the Players.List data stream 205d to track the number of players who are still remaining in the game. In general, the data stream 205g can be indicative of game events (e.g., not necessarily restricted to killing events) and may be referred to as Events data stream 205g. The game events' data can include additional information for various players, such as respective game scores, equipment, health states, emotional states, the like, or a combination thereof.

The Game.Camera data stream 205h can include information relating to the viewpoint 128 corresponding to the video game stream selected and transmitted from the composing and broadcast system 130 to the live streaming system 140 for display on the spectator client devices 150. In some implementations, a new data chunk may be included in the Game.Camera data stream 205h each time the selected video game stream or the corresponding viewpoint 128 (or camera perspective) provided to spectators changes. When the video game stream selected for broadcasting to client devices 150 changes, the video streaming engine 137 can halt transmitting streaming video/audio frames from the previously selected stream and start transmitting video/audio frames from the new selected stream to the live streaming system 140 for broadcasting to the client devices 150. In some implementations, the camera perspective shown to spectators may be the same as the perspective seen by one of the individual players as identified by the Viewport.Matrix data stream 205f. However, in some instances, the camera perspective shown to spectators may correspond to a virtual camera that is not associated with any of the individual players.

The Game.End data stream 205i includes a single data chunk, which can mark the end of the video game. In some implementations, the data chunk for the Game.End data stream 205i can be sent after every player has been eliminated from the game. In some other implementations, the data chunk for the Game.End data stream 205i can be sent after a predetermined period of time has elapsed since the start of the game, even if there are players who have not yet been eliminated from the game.

In some embodiments, the data streaming engine 139 can generate a second game data stream based on the streams 205c, 205d, and 205g-i. The data streaming engine 139 can combine data chunks from these streams to generate an asynchronous stream indicative of various events associated with the online game. In some embodiments, the data streaming engine 139 can stream the streams 205c-i separately to the spectator client devices 150, for example, through various logic communication channels.

Figure 3:
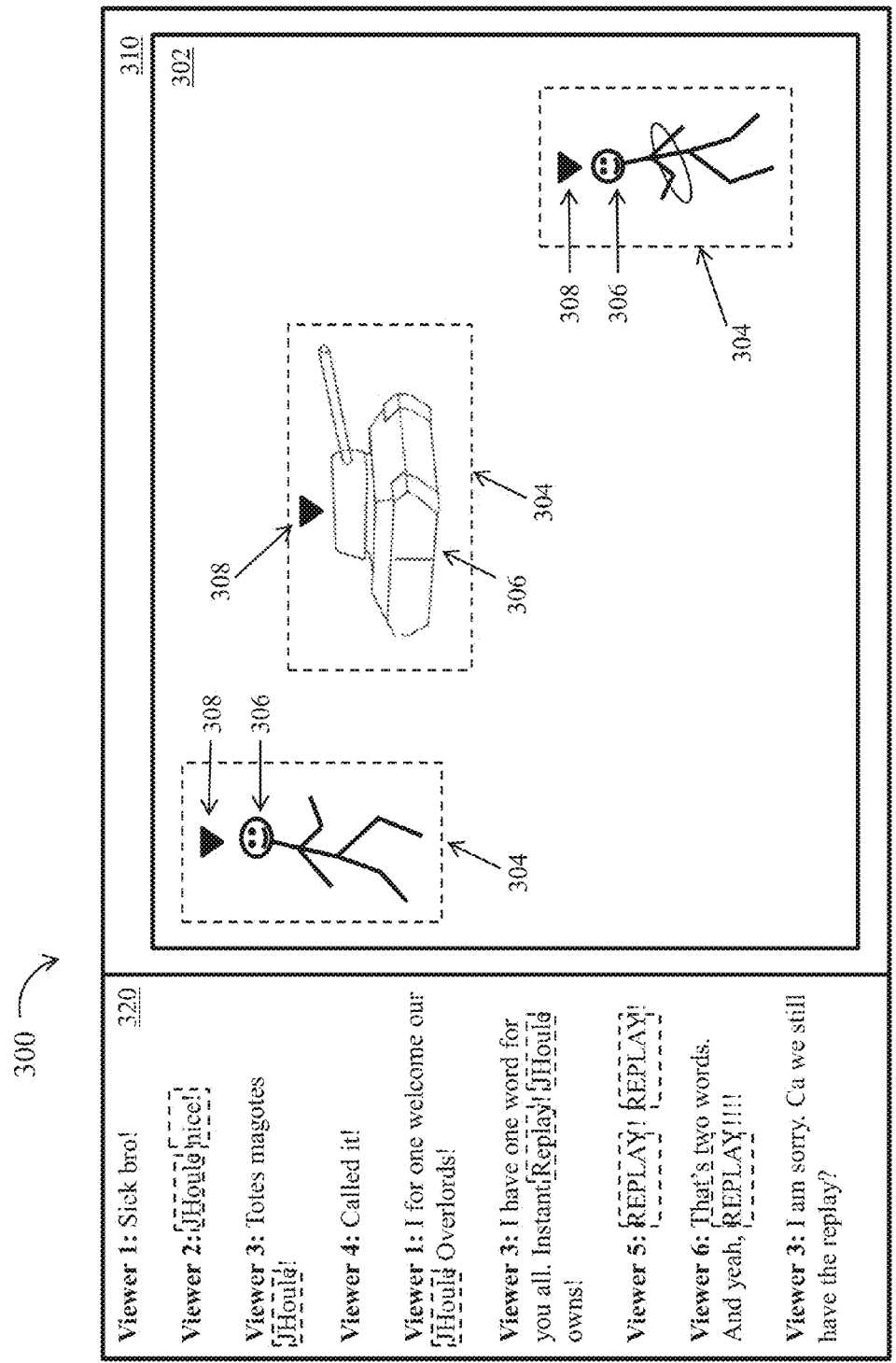
FIG. 3 shows a diagram illustrating a user interface for displaying video game data on a client device, according to some embodiments.

FIG. 3 shows a diagram illustrating a user interface (UI) 300 for displaying video game data on a client device, according to some embodiments. The UI 300 can include a first display window 310 for displaying video frames 302 and a second display window 320 for displaying chat messages. The video frame 302 can include a plurality of graphical objects 306, each associated with a respective overlay 304. The overlays 304 can be transparent (e.g., the dashed rectangles do not show up on the screen). Each interactive overlay 304 can be positioned over a respective graphical object 306. Each interactive overlay 304 can include a respective cursor-like triangle 308 pointing to respective player avatars 306. The cursor-like triangle 308 (or some other animation element) can indicate the presence of the corresponding overlay 304, or can be indicate to a user of the client device 150 that the corresponding graphical object 306 is selectable. Upon the user of the spectator client device 150 selecting (e.g., clicking on, touching or hovering over) a pixel area associated with one of the interactive overlays 304, the one or more scripts 154 can cause the spectator client device 150 to display an animation object 312 (e.g., a disc) in the vicinity of (e.g., over, on top of, or adjacent to) the selected graphical object 306 (e.g., a player avatar).

The one or more software scripts 154 can extract a timestamp from each game data frame received from the composing and broadcast system 130, and compare the extracted timestamp to one or more video timestamps associated with video game frames received from the live streaming system 140. To account for different time delays associated with game data stream and the video data stream, the one or more software scripts 154 can employ the synchronization techniques described in the in the U.S. patent application Ser. No. 15/352,433, entitled "SYSTEMS AND METHODS FOR UTILIZING CLIENT-SIDE SYNCHRONIZATION OF VIDEO AND OVERLAY,", which is incorporated herein by reference in its entirety. Also, the U.S. patent application Ser. No. 15/352,421, entitled "SYSTEMS AND METHODS OF VIDEO GAME STREAMING WITH INTERACTIVE OVERLAY AND ADDITIONAL DATA" is incorporated herein by reference in its entirety. The one or more software scripts 154 can also extract the position information (e.g., coordinates of various vertices of a pixel region defining a location of a player's avatar) for various graphical objects 306 from the game data frame, and use the extracted position information to determine the position of each interactive overlay 304. The interactive overlay(s) 304 can include a HyperText Markup Language (HTML) overlay.

While FIG. 3 shows the interactive overlay 304 to include a cursor-like triangle 308, according to other implementations, the interactive overlay 304 can include various shapes or animation objects to show to the user the presence of an interactive overlay 304 associated with a given graphical object 306, such as a player avatar. Also, when a graphical object 306 (e.g., a player avatar) is selected, the one or more software scripts 154 can employ various other animation objects or visual features (e.g., apart from the disc shown in FIG. 3) in the corresponding interactive overlay 304 to indicate the selection of that graphical object 306. Such animation object 312 and the corresponding overlay 304 can overlap the corresponding graphical object in each video following video frame. In some embodiments, upon selection of a given graphical object 306 (e.g., a player avatar), the one or more software scripts 154 can cause the spectator client device 150 to display game information associated with the selected graphical object 306 (e.g., a game score, equipment or armory, health state, emotional state, or a combination thereof). In some embodiments, the one or more software scripts 154 can cause the spectator client device 150 to enable customization of a selected graphical object 306. For example, the client device 150 can display one or more animation objects (e.g., objects indicative of eye glasses, hat, mask, costume, gun, sword, etc.). Upon the user selecting one of the animation objects, the one or more software scripts 154 can cause the spectator client device 150 to add the selected animation object to the overlay associated with the selected graphical object 306. To provide accurate customization, the game engine 120 may provide position and/or orientation information of a body part (e.g., head, eyes, arm, leg, etc.) for various player avatars as part of the game data. Using such information from the received game data, the client device 150 can accurately position the selected animation object relative to the avatar's body position and/or orientation in each video frame.

The one or more scripts 154 can cause the client device 150 to record or store indications of user interactions with the interactive overlays 304. For example, each time the user of the client device 150 interacts with a given overlay (e.g., by clicking, touching, hovering over, or customizing), the client device 150 can store a record including an indication of that overlay (or corresponding graphical object), the time of interaction, the type of interaction, or a combination thereof. In the case of player avatar customization, the client device 150 may store an indication of the type of customization.

The one or more scripts 154 can cause the client device 150 to monitor chat messages with other client devices 150. The client device 150 can process chat data in chat messages to extract predefined keywords, such player names (e.g., "JHoule" in the chat messages shown in FIG. 3), or terms expressing interest (e.g., "nice," "replay," "magnificent," "horrible," etc.). The predefined keywords can be provided by the composing and broadcast system 130 at the beginning of the streaming (e.g., with the players' list). In some embodiments, the client device 150 may map each extracted keyword to a respective viewer (e.g., the viewer associated with the chat message where the keyword appears). In some embodiments, each client device 150 may extract only keywords associated with its user (e.g., only chat messages sent to other client devices 150).

The one or more scripts 154 can cause the client device 150 to received audio input signals from a microphone communicative coupled to the client device. The audio signals can include audible expressions made by the user of the client device 150 while watching the online game. The one or more scripts 154 can cause the client device 150 to employ speech recognition techniques to translate the audio input signals into text, and extract one or more predefined keywords from the text.

In order to reduce the amount of data transmitted to the composing and broadcast system 130, the software script(s) 154 can cause the client device 150 to map the extracted keywords (e.g., from chat messages or from text generated based on speech signals) and the interactions' records to a predefined set (or predefined classes) of user reactions. The classes (or types) of user interactions can, for example, include "like," "replay," "love," "sad," and "mad." The client device 150 can map user comments and interactions recorded within a time interval to feedback data fields, each including a player (or graphical object) ID, a user reaction class, and a numerical value indicative of a count, a maximum value, minimum value, sum, average, or the like. For instance, the data field ["player 1," "like," "8"] can be indicative of eight "like" type reactions made by the user of the client device 150 with regard to player 1. The client device 150 can determine (or compute) a number of interactions with an overlay associated with "player 1" (or a respective avatar) and/or a number of keywords indicative of "like" reaction towards "player 1" to construct the data field. Using such data fields, the client device can generate significantly concise feedback data for sending to the composing and broadcast system 130. Furthermore, the software script(s) 154 can cause the client device 150 report user feedback data every 10 seconds, 20 seconds, 30 seconds, 60 seconds, or other time duration. The client device 150 can reduce user interactions and comments data collected during each time interval into one or more feedback data fields, and transmit the feedback data fields to the composing and broadcast system 130. It should be appreciated that other forms of feedback data fields may be defined and used.

The analysis engine 135 can receive feedback back fields from various client devices 150. The analysis engine 135 can analyze the feedback data received from various client devices 150 to determine aggregate user interests. For instance, the analysis engine 135 can determine a total count of user reactions per reaction class per player (or graphical object). For example, the analysis engine may compute the total number of "likes" for "player 1" considering feedback data from all client devices 150. The analysis engine 135 may also generate a heat map by mapping a total number of reactions for each player (or graphical object) per reaction class to a location in the virtual environment of the game associated with that player in the last time interval (e.g., last 10 seconds, last 20 seconds, last 30 seconds, last 60 seconds, etc.).

The analysis engine 135 can identify one or more video game streams 128 based on the analysis results. For example, if a relatively large number of viewers like "player 1," the analysis engine 135 may identify a video game stream 128 associated with a viewpoint corresponding to "player 1" as preferable video game stream. If both "player 1" and "player 2" are associated with a large number of "likes," (or a region in the heat map is associated with a large number of "likes"), then the analysis engine 135 may identify a video game stream associated with a virtual camera showing both "player 1" and "player 2" (or showing a region indicated in the heat map to be associated with a large number of "likes") as a preferred video game stream. If a large number of 'replay' reactions are received from various viewers, the analysis engine 135 may identify a previous segment (e.g., the last 60 second or the last 2 minutes) of the video game stream currently being streamed as preferred for streaming. In some instances, the analysis engine 135 may identify more than one video game stream based on the analysis results (e.g., aggregate viewers' feedback indicates interest in two or more players).

The analysis engine 135 can determine a modification to one or more viewpoints based on the analysis results. The analysis engine 135 can determine an adjustment to parameters of one or more virtual cameras to achieve a view that spans (or shows) multiple player avatars or a given region of the virtual environment of the online game that the viewers are interested in. For example, the analysis engine 135 may determine a zoom out or zoom in action for one or more virtual cameras of the online game. The analysis engine 135 may determine a new position and/or orientation for one or more virtual cameras. In some instances, the analysis engine 135 may determine a motion path for one or more virtual cameras, for example, to track one or more player avatars or an on-going game event of the online game. Furthermore, the analysis engine 135 may identify new resolution(s) or format(s) for one or more video game streams. For example, the analysis engine 135 may determine that two or more video game streams are to be presented to spectator client devices 150 as picture-in-picture or according to a split-screen format (e.g., each reduced resolution video game stream can be displayed in a half-screen or quadrant-screen region).

The analysis engine 135 can then send indication(s) of the identified video game stream(s) and/or video game segment(s) (e.g., in case of replay) to the video streaming engine 137. In response, the video streaming engine 137 can switch to streaming the identified video game stream(s). For example, if the video streaming engine 137 is streaming video game frames from "stream 1," and receives an indication (or identifier) of "stream 3," then the video streaming engine 135 can halt streaming video game frames from "stream 1" and starts streaming video game frames from "stream 3." Also, if an indication of a video segment in the video game stream being streamed is received (e.g., indication of replay), the video streaming engine 135 can start streaming video game frames from the indicated video segment. The video streaming engine 135 can inform the data streaming engine 139 of the change (or switch) to the new video game stream.

The analysis engine 135 can send indication(s) of new parameters (or changes to existing parameters) for one or more video game streams to the renderer 126 or the game engine 120. In response, the game engine 120 or the renderer 126 can generate at least one video game stream according to the new parameters. For example, the renderer 126 can generate one or more video game streams associated with new (or modified) viewpoint(s), moving viewpoint(s), new (or modified) resolution(s), new (or modified) format (e.g., picture-in-picture format or split-screen format), or a combination thereof. The renderer 126 can provided the generated video game stream(s) to the video streaming engine 137 for broadcasting to the spectator client devices 150 via the live streaming system 140.

In some embodiments, the video streaming engine 137 may switch to streaming video game frames from two streams simultaneously, if indication of two streams are received from analysis engine 135. For example, the video streaming engine 137 may resize video frames associated with at least one of the two streams to allow display of both streams in separate display windows or allow display of one stream embedded in the other.

Figure 4:
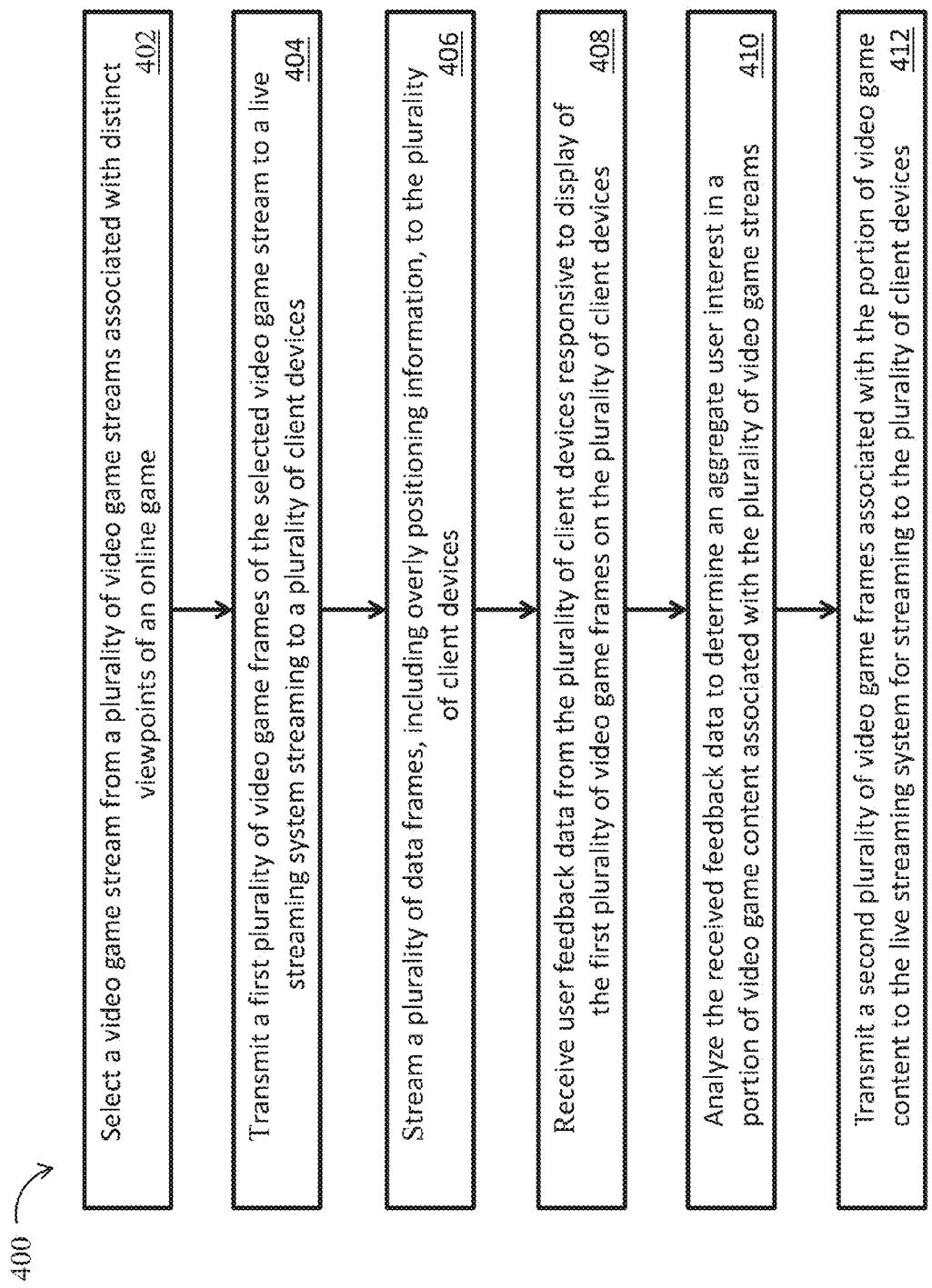
FIG. 4 is flow diagram illustrating a method of providing adaptable live video game streaming based on spectator user feedback, according to some embodiments.

FIG. 4 shows a flow diagram illustrating a method 400 of providing adaptable live video game streaming, according to some embodiments. The method 400 can include selecting a video game stream from a plurality of video game streams associated with distinct viewpoints of an online game (ACT 402), and transmitting a first plurality of video game frames of the selected video game stream to a live streaming system streaming to a plurality of client devices associated with a respective plurality of spectators of the online game (ACT 404). The method 400 can include streaming a plurality of data frames, including overly positioning information, to the plurality of client devices (ACT 406). The method 400 can include receiving user feedback data from the plurality of client devices responsive to display of the first plurality of video game frames on the plurality of client devices (ACT 408). The method 400 can include analyzing the received feedback data to determine an aggregate user interest in a portion of video game content associated with the plurality of video game streams (ACT 410), transmitting a second plurality of video game frames associated with the portion of video game content to the live streaming system for streaming to the plurality of client devices (ACT 412).

The method 400 can include the selecting a video game stream from a plurality of video game streams associated with distinct viewpoints of an online game (ACT 402), and transmitting a first plurality of video game frames of the selected video game stream to a live streaming system streaming to a plurality of client devices associated with a respective plurality of spectators of the online game (ACT 404). Upon receiving a request to register a game play for live streaming, the composing and broadcast system 130 can assign a stream ID to the game play and provide the stream ID to the game engine 120. As the game is progressing, the game engine 120 can generate a plurality of video games streams, each associated with a respective viewpoint. Each viewpoint can be associated with a player of the game or a virtual camera in the virtual environment of the game. Each video game stream can include a respective video stream and a respective audio stream. The game engine 120 can provide the generated frames of the plurality of video game streams to the composing and broadcast system 130 as they are generated, in real time. The video streaming engine 137 can receive video and audio frames of the plurality of video games streams. The composing and broadcast system 130 can select a video game stream among the plurality of video game streams for broadcasting to a plurality of client devices 150 for viewing. The video streaming engine 137 can compress video and audio frames of the selected video game stream to generate a compressed video/audio stream. The video streaming engine 137 can transmit compressed video/audio frames to the live streaming system 140, for live streaming to the plurality of client devices 150. The live streaming system can stream compressed video/audio frames of the selected video game stream to the plurality of client devices 150.

The method 400 can include streaming a plurality of data frames, including overly positioning information, to the plurality of client devices (ACT 406). The data streaming engine 139 can generate data frames as discussed above with regard to FIGS. 1 and 2. Each data frame can correspond to a respective video game frame transmitted to the live streaming system 140 for broadcasting to the client devices 150. Each data frame can include position information of one or more graphical objects (or player avatar(s)) indicative of the position(s) of the graphical object(s) in the respective video frame. Such positioning information can be used by client devices 150 to position one or more interactive overlays over displayed video frames.

The method 400 can include The method 400 can include receiving, user feedback data from the plurality of client devices responsive to display of the first plurality of video game frames on the plurality of client devices (ACT 408), and analyzing the received feedback data to determine an aggregate user interest in a portion of video game content associated with the plurality of video game streams (ACT 410). User feedback data can be generated at the client devices responsive to user interactions with the interactive overlays or user comments as discussed with regard to FIG. 3 above. The analysis engine 135 can analyze feedback data received from various client devices 150 to determine aggregate user interest in one or more aspects of the online game (e.g., as discussed with respect to FIG. 3 above). The analysis engine 135 can determine a switch from one video game stream to another, a switch from one video segment to another, a modification in viewpoint of a given video game stream, a change in resolution and/or format of a given video game stream, or a combination thereof, based on the analysis results.

The method 400 can include transmitting a second plurality of video game frames associated with a portion of video game content associated with the one or more aspects of the online game to the live streaming system for streaming to the plurality of client devices (ACT 412). As discussed above with regard to FIG. 3, the video steaming engine 135 can switch from one video game stream (currently streamed) to one or more other streams, or replay a video segment from the current video game stream, responsive to the analysis results. The game engine 120 can generate a video game stream, or video game frames thereof, according to new parameters (or parameter adjustments) received from the analysis engine 135 (e.g., modified or new viewpoint position, modified or new viewpoint orientation, modified or new resolution, modified or new format, or a combination thereof) of one or more video game streams for broadcasting to spectator client devices 150.

Figure 5:
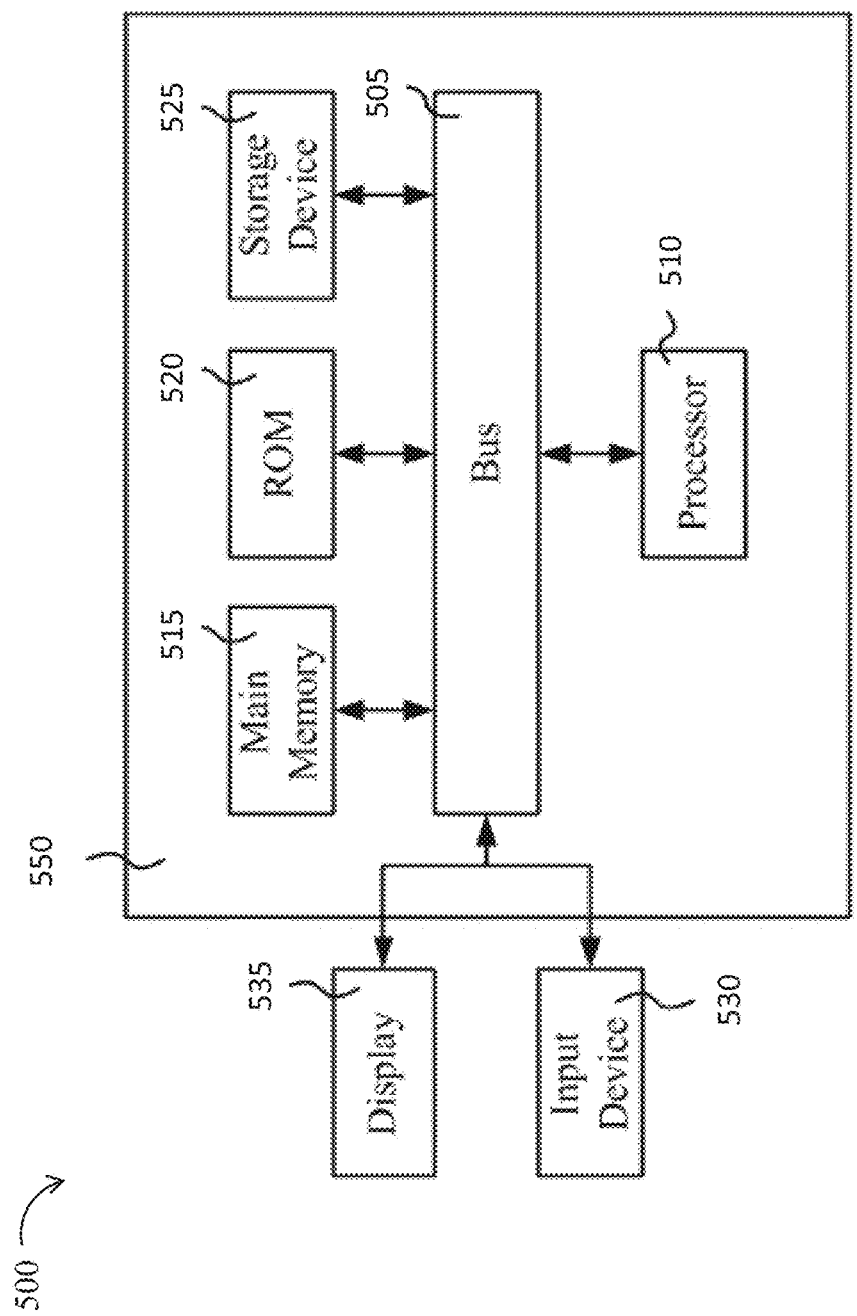
FIG. 5 is a block diagram of a computer system, according to some embodiments.

FIG. 5 is a block diagram of a computer system 500 that can be used to implement the player client devices 110, the game engine 120 or components thereof, the composing and broadcast system 130 or components thereof, the spectator client devices 150, or other components described herein. The computing system 500 includes a bus 505 or other communication component for communicating information and a processor 510 coupled to the bus 505 for processing information. The computing system 500 can also include one or more processors 510 coupled to the bus for processing information. The computing system 500 also includes main memory 515, such as a RAM or other dynamic storage device, coupled to the bus 505 for storing information, and instructions to be executed by the processor 510. Main memory 515 can also be used for storing position information, temporary variables, or other intermediate information during execution of instructions by the processor 510. The computing system 500 may further include a ROM 520 or other static storage device coupled to the bus 505 for storing static information and instructions for the processor 510. A storage device 525, such as a solid state device, magnetic disk or optical disk, is coupled to the bus 505 for persistently storing information and instructions. Computing device 500 may include, but is not limited to, digital computers, such as laptops, desktops, workstations, personal digital assistants, servers, blade servers, mainframes, cellular telephones, smart phones, mobile computing devices (e.g., a notepad, e-reader, etc.) etc.

The computing system 500 may be coupled via the bus 505 to a display 535, such as a Liquid Crystal Display (LCD), Thin-Film-Transistor LCD (TFT), an Organic Light Emitting Diode (OLED) display, LED display, Electronic Paper display, Plasma Display Panel (PDP), or other display, etc., for displaying information to a user. An input device 530, such as a keyboard including alphanumeric and other keys, may be coupled to the bus 505 for communicating information and command selections to the processor 510. In another implementation, the input device 530 may be integrated with the display 535, such as in a touch screen display. The input device 530 can include a cursor control, such as a mouse, a trackball, or cursor direction keys, for communicating direction information and command selections to the processor 510 and for controlling cursor movement on the display 535.

According to some implementations, the processes or methods described herein can be implemented by the computing system 500 in response to the processor 510 executing an arrangement of instructions contained in main memory 515. Such instructions can be read into main memory 515 from another computer-readable medium, such as the storage device 525. Execution of the arrangement of instructions contained in main memory 515 causes the computing system 550 to perform the illustrative processes or method ACTs described herein. One or more processors in a multi-processing arrangement may also be employed to execute the instructions contained in main memory 515. In alternative implementations, hard-wired circuitry may be used in place of or in combination with software instructions to effect illustrative implementations. Thus, implementations are not limited to any specific combination of hardware circuitry and software.

Although an implementation of a computing system 500 has been described in FIG. 5, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Some embodiments can be implemented in digital electronic circuitry, or in computer software embodied on a tangible medium, firmware, or hardware, including the structures disclosed in this specification and their structural equivalents, or in combinations of one or more of them. Some embodiments can be implemented as one or more computer programs, e.g., one or more modules of computer program instructions, encoded on one or more computer storage media for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be performed by a data processing apparatus on data stored on one or more computer-readable storage devices or received from other sources.

The terms "data processing apparatus," "computing device," or "processing circuit" encompass all kinds of apparatus, devices, and machines for processing data, including by way of example a programmable processor, a computer, a system on a chip, or multiple ones, a portion of a programmed processor, or combinations of the foregoing. The apparatus can include special purpose logic circuitry, e.g., an FPGA or an ASIC. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination.

Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single software product or packaged into multiple software products embodied on tangible media.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Where technical features in the drawings, detailed description or any claim are followed by reference identifiers, the reference identifiers have been included to increase the intelligibility of the drawings, detailed description, and claims. Accordingly, neither the reference identifiers nor their absence have any limiting effect on the scope of any claim elements.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The claims should not be read as limited to the described order or elements unless stated to that effect. It should be understood that various changes in form and detail may be made without departing from the spirit and scope of the appended claims. All implementations that come within the spirit and scope of the following claims and equivalents thereto are claimed.

What is claimed is:

1. A system to provide adaptable video game streaming, the system comprising:
   one or more computer servers comprising a video streaming engine and an analysis engine,
   the video streaming engine configured to:
      select a video game stream from a plurality of video game streams associated with distinct viewpoints of an online game; and
      transmit a first plurality of video game frames of the selected video game stream to a live streaming system, the live streaming system configured to stream the first plurality of video game frames to a plurality of client devices associated with a respective plurality of spectators of the online game, and
   the analysis engine configured to:
      receive feedback data from the plurality of client devices, the feedback data related to user interactions with one or more interactive overlays or to user comments made responsive to display of the first plurality of video game frames on the plurality of client devices;
      analyze the received feedback data to determine an aggregate user interest in a portion of video game content associated with the plurality of video game streams; and
      cause the video streaming engine to transmit a second plurality of video game frames associated with the portion of video game content to the live streaming system for streaming to the plurality of client devices.

2. The system of claim 1 further comprising one or more software scripts executing on the plurality of client devices, the one or more software scripts causing a client device of the plurality of client devices to generate respective feedback data, and transmit the generated feedback data to the one or more computer servers.

3. The system of claim 2, wherein generating the respective feedback data includes:
   extracting one or more keywords from chat data related to a chat conversation with one or more other client devices; and
   determining an interest level in the portion of video game content based on the extracted one or more keywords.

4. The system of claim 2, wherein generating the respective feedback data includes:
   determining a number of interactions with an interactive overly of the one or more overlays.

5. The system of claim 2, wherein generating the respective feedback data includes:
   speech processing an input audio signal to the client device to identify one or more keywords; and
   determining an interest level in the portion of video game content based on the identified one or more keywords.

6. The system of claim 1, wherein determining an aggregate user interest in a portion of video game content associated with the plurality of video game streams includes determining an aggregate user interest in a player avatar of the online game.

7. The system of claim 6, wherein causing the video streaming engine to transmit a second plurality of video game frames includes:
   providing an indication of the player avatar to the video streaming engine;
   selecting, by the video streaming engine, a second video game stream of the plurality of video game streams associated with a viewpoint corresponding to the player avatar; and
   transmitting, by the video streaming engine, a plurality of video game frames from the second video game stream to the live streaming system.

8. The system of claim 1, wherein determining an aggregate user interest in a portion of video game content associated with the plurality of video game streams includes determining an aggregate user interest in replaying a subset of the first plurality of video game frames, and wherein causing the video streaming engine to transmit a second plurality of video game frames includes:
   providing an indication of a the subset of the first plurality of video game frames to the video streaming engine; and
   transmitting, by the video streaming engine, the subset of the first plurality of video game frames to the live streaming system.

9. The system of claim 1, wherein causing the video streaming engine to transmit a second plurality of video game frames includes:
the analysis engine determining one or more new parameters for a video game stream;
the analysis engine providing the one or more new parameters to a game engine for generating video game frames of that video game stream according to the one or more new parameters;
the video streaming engine receiving, from the game engine, the video game frames generated according to the one or more new parameters; and
the video streaming engine transmitting the video game frames generated according to the one or more new parameters to the live streaming system.

10. The system of claim 1, wherein the analysis engine is configured to generate a heat map indicative of use interests of various regions of a virtual environment of the online game.

11. A method for providing adaptable live video game streaming, the method comprising:
selecting, by one or more servers, a video game stream from a plurality of video game streams associated with distinct viewpoints of an online game;
transmitting, by the one or more servers, a first plurality of video game frames of the selected video game stream to a live streaming system, the live streaming system configured to stream the first plurality of video game frames to a plurality of client devices associated with a respective plurality of spectators of the online game; receiving, by the one or more servers, feedback data from the plurality of client devices, the feedback data related to user interactions with one or more interactive overlays or to user comments made responsive to display of the first plurality of video game frames on the plurality of client devices;
analyzing, by the one or more servers, the received feedback data to determine an aggregate user interest in a portion of video game content associated with the plurality of video game streams; and
transmitting, by the one or more servers, a second plurality of video game frames associated with the portion of video game content to the live streaming system for streaming to the plurality of client devices.

12. The method of claim 11 further comprising:
generating, by client device of the plurality of client devices, respective feedback data; and
transmitting, by the client device, the generated feedback data to the one or more computer servers.

13. The method of claim 12, wherein generating the respective feedback data includes:
extracting one or more keywords from chat data related to a chat conversation with one or more other client devices; and
determining an interest level in the portion of video game content based on the extracted one or more keywords.

14. The method of claim 12, wherein generating the respective feedback data includes:
determining a number of interactions with an interactive overly of the one or more overlays.

15. The method of claim 12, wherein generating the respective feedback data includes:
speech processing an input audio signal to the client device to identify one or more keywords; and
determining an interest level in the portion of video game content based on the identified one or more keywords.

16. The method of claim 11, wherein determining an aggregate user interest in a portion of video game content associated with the plurality of video game streams includes determining an aggregate user interest in a player avatar of the online game.

17. The method of claim 16, wherein transmitting a second plurality of video game frames includes:
providing an indication of the player avatar to the video streaming engine;
selecting a second video game stream of the plurality of video game streams associated with a viewpoint corresponding to the player avatar; and
transmitting a plurality of video game frames from the second video game stream to the live streaming system.

18. The method of claim 11, wherein determining an aggregate user interest in a portion of video game content associated with the plurality of video game streams includes determining an aggregate user interest in replaying a subset of the first plurality of video game frames, and wherein transmitting a second plurality of video game frames includes:
providing an indication of a the subset of the first plurality of video game frames to the video streaming engine; and
transmitting the subset of the first plurality of video game frames to the live streaming system.

19. The method of claim 11, wherein transmitting a second plurality of video game frames includes:
determining, by the analysis engine, one or more new parameters for a video game stream;
providing, by the analysis engine, the one or more new parameters to a game engine for generating video game frames of that video game stream according to the one or more new parameters;
receiving, by the video streaming engine, from the game engine, the video game frames generated according to the one or more new parameters; and
transmitting, by the video streaming engine, the video game frames generated according to the one or more new parameters to the live streaming system.

20. A non-transitory computer-readable medium comprising computer code instructions stored thereon, the computer code instructions, when executed by one or more processors, cause the one or more processors to perform the method including:
selecting a video game stream from a plurality of video game streams associated with distinct viewpoints of an online game;
transmitting, a first plurality of video game frames of the selected video game stream to a live streaming system, the live streaming system configured to stream the first plurality of video game frames to a plurality of client devices associated with a respective plurality of spectators of the online game;
receiving feedback data from the plurality of client devices, the feedback data related to user interactions with one or more interactive overlays or to user comments made responsive to display of the first plurality of video game frames on the plurality of client devices;
analyzing the received feedback data to determine an aggregate user interest in a portion of video game content associated with the plurality of video game streams; and
transmitting a second plurality of video game frames associated with the portion of video game content to the live streaming system for streaming to the plurality of client devices.

* * * * *